United States Patent [19]

Otsuka

[11] Patent Number: 4,577,315

[45] Date of Patent: Mar. 18, 1986

[54] POWER SAVING SYSTEM FOR TIME-DIVISION MULTIPLE ACCESS RADIOCOMMUNICATION NETWORK

[75] Inventor: Shigeru Otsuka, Tokyo, Japan

[73] Assignee: NEC Corporation, Tokyo, Japan

[21] Appl. No.: 633,993

[22] Filed: Jul. 24, 1984

[30] Foreign Application Priority Data

Jul. 25, 1983 [JP] Japan .................. 58-135389

[51] Int. Cl.$^4$ .................. H04J 3/16; H04B 1/00; H04B 7/00; G08B 5/22
[52] U.S. Cl. .................. 370/95; 455/58; 455/68; 455/70; 340/825.44
[58] Field of Search ............ 455/68, 70, 58; 340/825.5, 825.44; 370/95, 119

[56] References Cited

U.S. PATENT DOCUMENTS

| | | | |
|---|---|---|---|
| 4,245,347 | 1/1981 | Hutton et al. | 455/70 |
| 4,367,557 | 1/1983 | Stern et al. | 455/70 |
| 4,369,443 | 1/1983 | Giallanza et al. | 455/70 |
| 4,424,514 | 1/1984 | Fennell et al. | 340/825.44 |
| 4,506,386 | 3/1985 | Ichikawa et al. | 340/825.44 |
| 4,509,199 | 4/1985 | Ichihara | 455/70 |

Primary Examiner—Douglas W. Olms
Assistant Examiner—Wellington Chin
Attorney, Agent, or Firm—Sughrue, Mion, Zinn, Macpeak, and Seas

[57] ABSTRACT

In a time-division multiple access (TDMA) communication network, a power saving system interleaves a power saving control signal at periodic intervals with a selection signal and information signals and transmits the interleaved signals from a master station to slave stations. A plurality of power cut-off circuits are associated respectively with the slave stations for individually cutting off power supplies to the slave stations for a predetermined period in response to the control signal. A detector is provided for detecting the moment a connection is being established, identifying the slave station establishing the connection and selectively inhibiting the power cut-off circuit associated with the identified station from responding to the control signal, while allowing the remainder of the power cut-off means to respond to the control signal.

12 Claims, 11 Drawing Figures

POWER SAVING SYSTEM FOR TIME-DIVISION MULTIPLE ACCESS RADIOCOMMUNICATION NETWORK

BACKGROUND OF THE INVENTION

The present invention relates generally to radiocommunication networks for relaying time-division multiplexed signals, and in particular to a power saving system for a time-division multiple access (TDMA) communication network for interrupting power supplies during idle periods for the purpose of minimizing power consumption.

Periodic interruption of power supplies to the principal units of repeater and terminal stations in a radiocommunication network is a scheme known as power saving. Power saving of this type is essential to the operation of radiocommunication stations located at remote places or emergency radio repeater stations which rely on storage batteries. However, the conventionl power saving scheme has a disadvantage in that a time-division multiple access communication system must be operated either on a power-saving enabled mode or a power-saving disabled mode during mutually exclusively times. Therefore, power saving operations for stations which remain idle must also be disabled.

SUMMARY OF THE INVENTION

The present invention is to eliminate the above mentioned prior art problem and has for its object the provision of a power saving system which allows stations to effect power saving in a time division multiple access radio communication system even though such stations do not contribute to the establishment of switched connection.

The present invention provides a battery saving system for a time-division multiple access (TDMA) communication network which comprises a first, or master station and a plurality of second, or slave stations capable of individually establishing connections with said first station in response to a selection signal and relaying information signals through the established connections.

According to the invention, the power saving system interleaves a power saving control signal at periodic intervals with the selection signal and information signals and transmits the interleaved signals from the first station to the second stations. A plularity of power cut-off circuits are associated respectively with the second stations for individually cutting off power supplies to the second stations for a predetermined period in response to the control signal. A detector is provided for detecting the moment a connection is being established, idenfifying the second station establishing the connection and selectively inhibiting the power cut-off circuit associated with the identified station from responding to the control signal, while allowing the remainder of the power cut-off means to respond to the control signal.

BRIEF DESCRIPTION OF THE DRAWINGS

The present invention will be described in further detail with reference to the accompanying drawings, in which.

DETAILED DESCRIPTION

Before going into the detail of the present invention, reference is first made to FIGS. 1-4 in which a time-division multiplexed (TDM) radiocommunication network is shown operating according to a prior art power saving mode.

Figure 1:
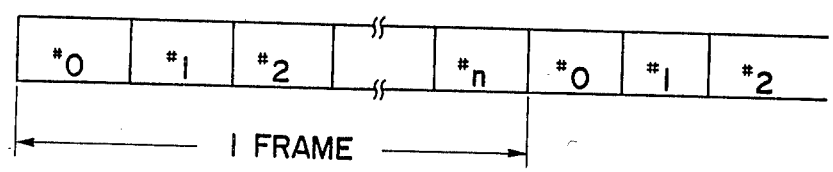
FIG. 1 is an illustration of the frame organization of prior art time-division multiplexed signals.
Figure 2:
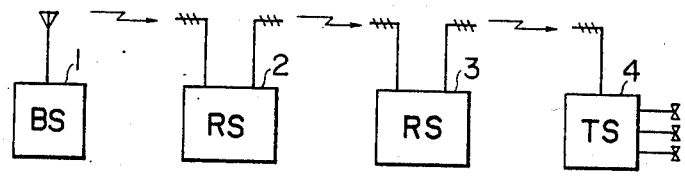
FIG. 2 is a schematic illustration of a base station, repeater stations and a terminal station connected in tandem.
Figure 3:
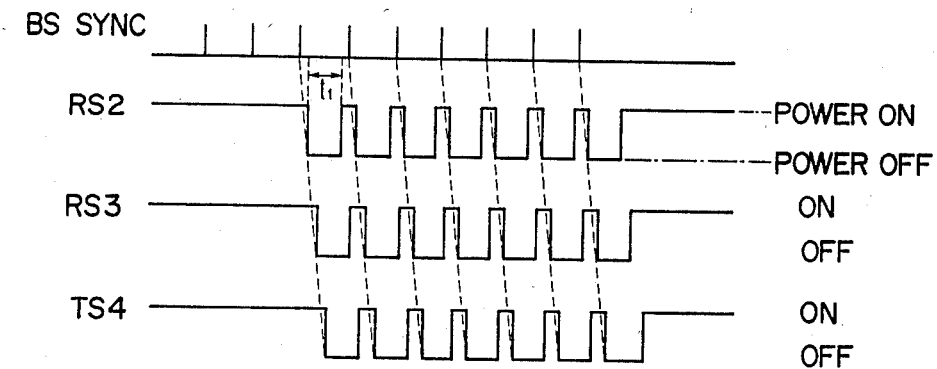
FIG. 3 is a timing diagram illustrating the detail of the battery saving operation of FIG. 3.

In FIG. 1, channels are allotted to different time slots (No. 0, No. 1 to No. n) within a frame. Sync signal is used to enable a radiocommunication network (FIG. 2) to discriminate between different time slots. Such radiocommunication network includes a base station connected to the public telecommunication network, one or more repeater stations 2, 3 and a terminal stations 4 all of which are connected in tandem. To ensure communication during power saving modes in which power supply is interrupted at regular intervals, power saving operation is also synchronized between the stations. If all channels are idle, the base station transmits a battery saving synchronization signal (BS sync signal) at regular intervals, FIG. 3. Battery saving operation is initiated when three of such sync signals, for example, are correctly received in succession by the repeater and terminal stations.

The turn-on period of the power saving operation is determined so that it allows repeater and terminal stations to receive battery saving sync signals during such periods. More specifically, when the repeater and terminal stations have received three BS sync signals consecutively, these stations cut off power supply to their power-consuming principal units for a period $t_1$, FIG. 3, and turn on power supply again to detect a fourth BS sync signal. In response to the detection of the fourth BS sync signal, power supply is again turned off for a predetermined period. The process is repeated until the base station receives a call terminating to it from the public network or a call originating from terminal station 4. When the base station detects a terminating call, it immediately stops the transmission of BS sync signal to establish a connection to the destination terminal station. When a call is originated from terminal station 4, it sends an originating call signal to the base station 1 during the interval between successive BS sync signals. Upon detection of the originating call signal, the base station 1 immediately halts the transmission of BS sync signals to establish connection.

Figure 4:
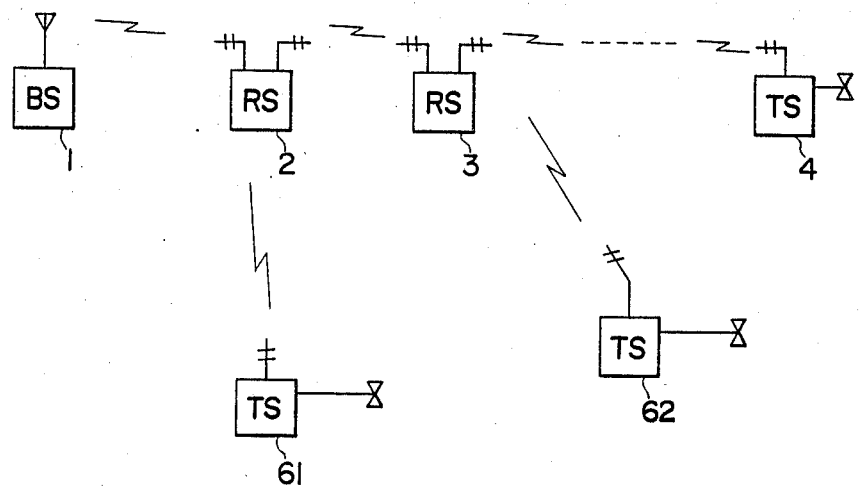
FIG. 4 is an illustration of a time-division multiple access comunication network in which the present invention is incorporated.

If the power saving system of this type is to be employed in a time-division multiple access network (TDMA) as shown in FIG. 4 in which the repeater stations 2, 3 have switching functions to establish switched connections to terminal stations 61 and 62, it is impossible to effect the power saving operation for stations 61 and 62 if connection is established between base station 1 and terminal station 4.

Figure 5:
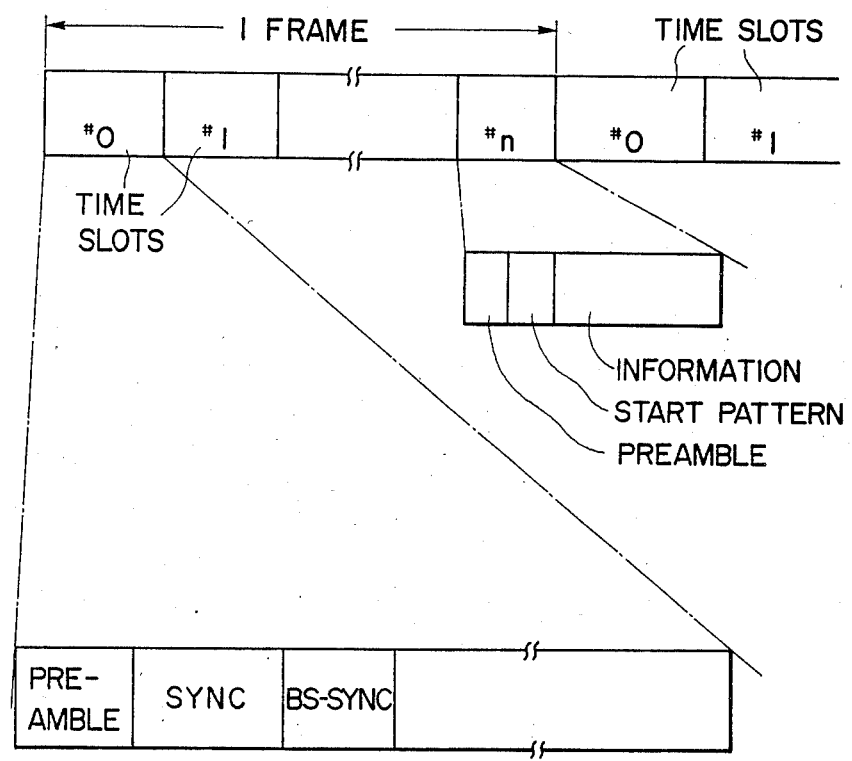
FIG. 5 is an illustration of a frame organization of the time-division multiplexed signals according to the present invention employed in the system of FIG. 5.

FIG. 5 shows a frame organization employed in the TDMA radiocommunication network of FIG. 4. As shown in an expanded form, the time slot No. 0 includes a preamble, a sync signal and a battery saving sync signal. The time slots No. 1 to No. n are data slots each including a preamble, a start pattern which indicates the beginning of an information signal that follows.

Figure 6:
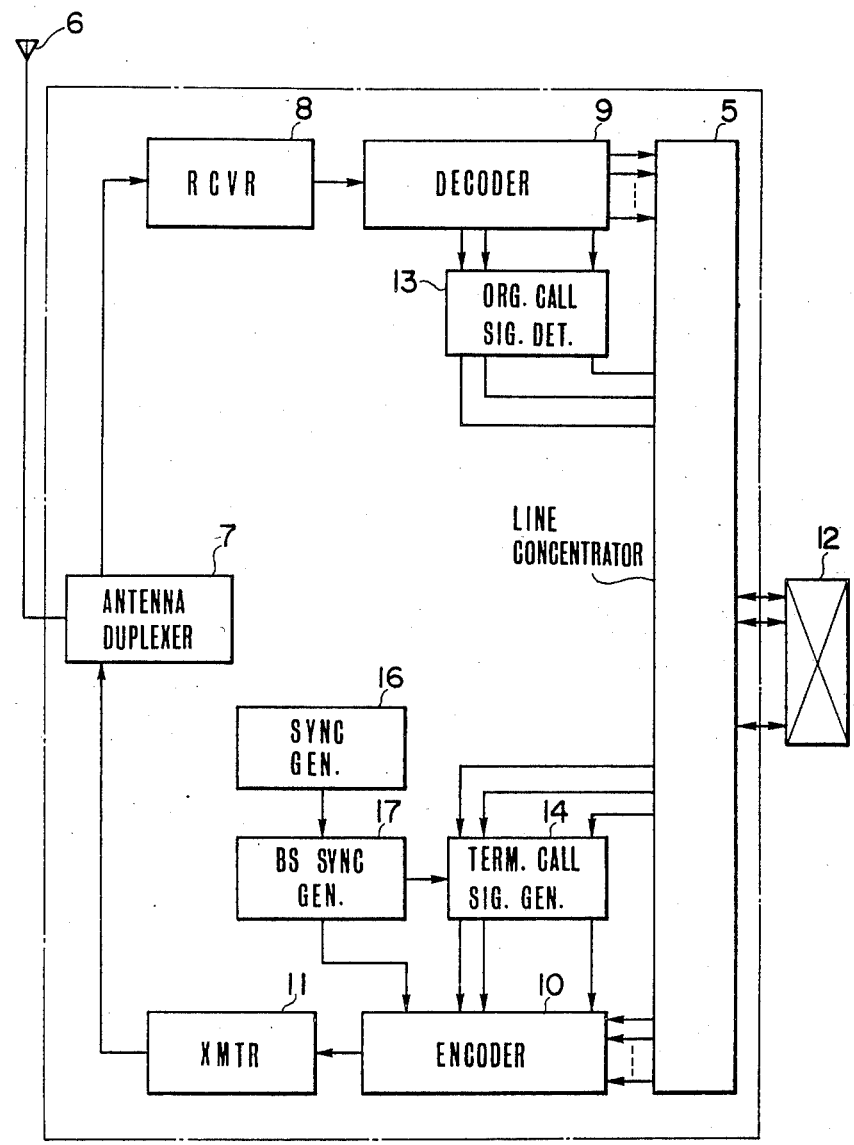
FIG. 6 is a block diagram of the base station according to the present invention.

As shown in FIG. 6, the base station 1 of FIG. 4 comprises a line concentrator 5 connected to a switching system 12 which forms part of the public telecommunication network. Signals intercepted by an antenna 6 are fed through an antenna duplexer 7 and a receiver 8 to a decoder 9 the output of which is connected to the line concentrator 5. The line concentrator 5 has its output terminals coupled to an encoder 10 whose output is coupled by way of a transmitter 11 and antenna duplexer 7 to antenna 6. An originating call detector 13 is connected between the line concentrator 5 and decoder 9 and a terminating call signal generator 14 is connected between the line concentrator 5 and encoder 10. The originating call signal detected by detector 13 contains a code identifying the originating terminal station. The terminating call signal generated by generator 14, on the other hand, contains a selective code for selecting a time slot assigned to the destination terminal station. A sync generator 16 provides clock pulses to a battery saving sync generator 17 whose output is connected to encoder 10 and terminating call signal generator 14.

Figure 7:
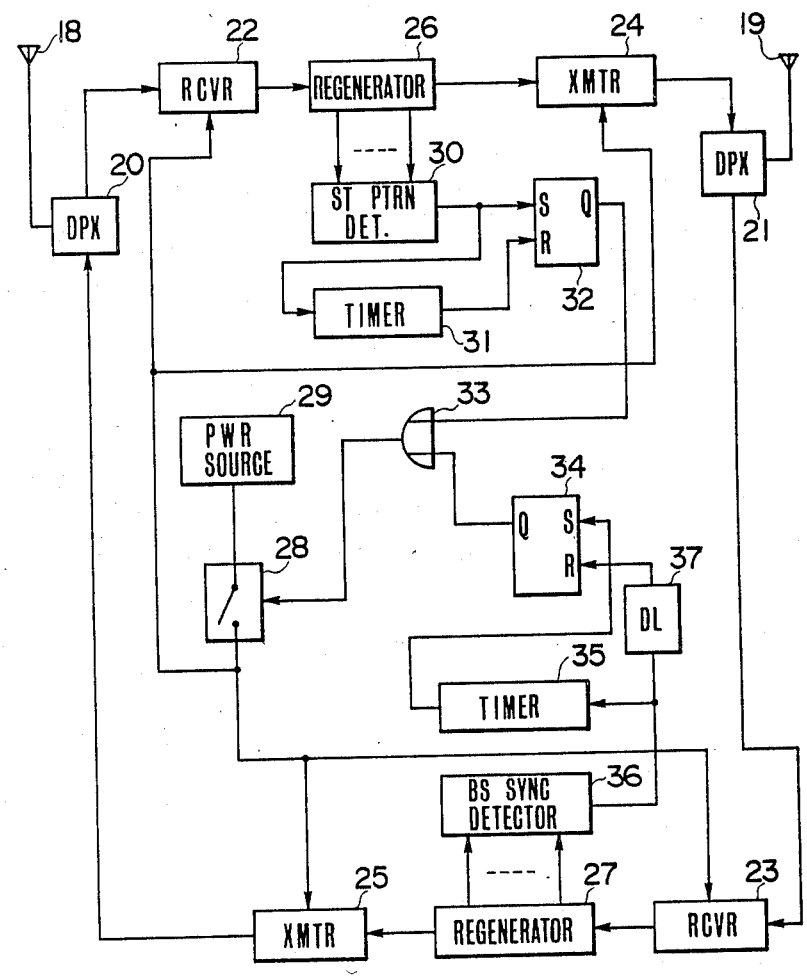
FIG. 7 is a block diagram of a repeater station according to the present invention.

FIG. 7 is a block diagram of each of repeater stations 2 and 3 of FIG. 4. Antennas 18 and 19 are coupled respectively to antenna duplexers 20 and 21. Antenna duplexer 20 has its output coupled through receiver 22 to a regenerator 26 and thence to the transmitter 24. The output of transmitter 24 is connected to the antenna duplexer 21 whose output is coupled to a receiver 23 which in turn is connected through a regenerator 27 to a transmitter 25. The output of transmitter 25 is connected to the antenna duplexer 20. A power switch 28 is provided having a stationary contact connected to the receivers 22 and 23 and transmitters 24 and 25 which are the principal units that account for a substantial fraction of the total power consumption of the repeater station.

To regenerator 27 is connected a BS sync detector 36 whose output is coupled to a timing circuit 35 and to a delay circuit 37. The output of timing circuit 35 is connected to the set input of a flip-flop 34 and the output of delay circuit 35 is connected to the reset input of the flip-flop. The output of flip-flop 34 is connected to one input of an OR gate 33, the output of which is connected to the control terminal of the power switch 28. To the regenerator 26 is connected a start pattern detector 30 whose output is applied to a timing circuit 31 and to the set input of a flip-flop 32 which is arranged to be reset in response to an output from the timing circuit 31.

The output of flip-flop 32 is connected to the second input of OR gate 33.

Figure 8:
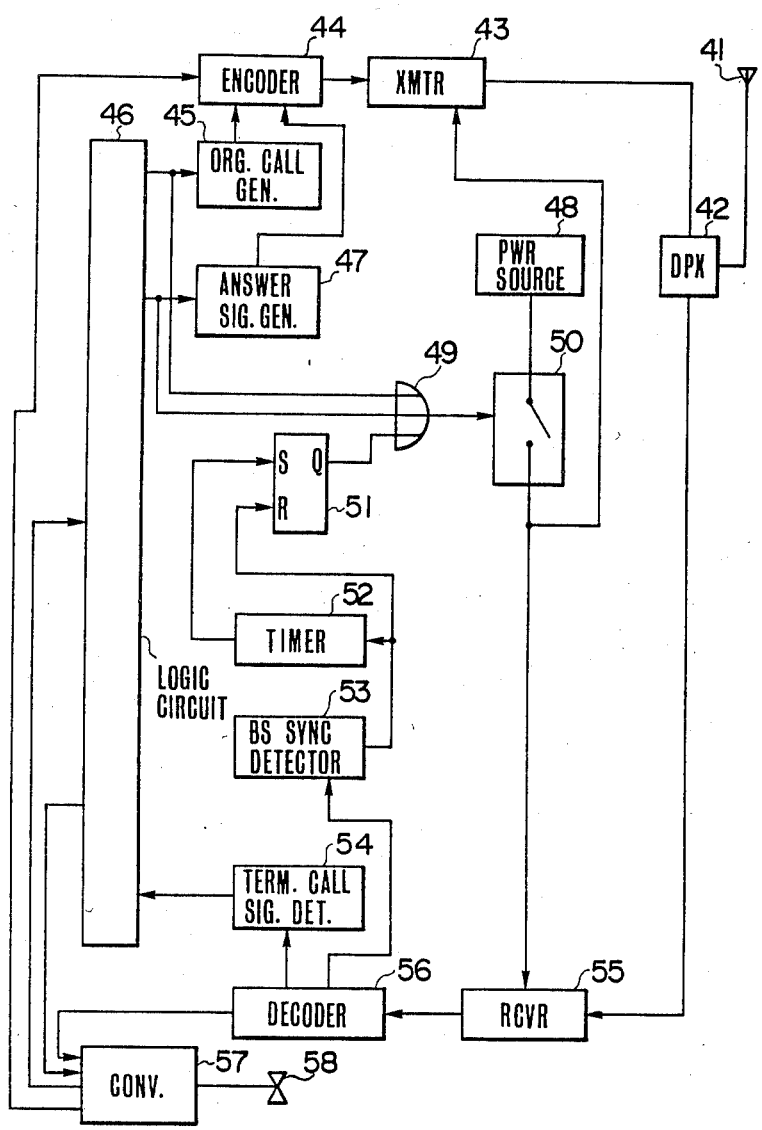
FIG. 8 is a block diagram of a terminal station according to the present invention.

FIG. 8 is a block diagram of each of the terminal stations of FIG. 4. Antenna 41 is coupled by way of an antenna duplexer 42 to a transmitter 43 and a receiver 55. Power source 48 is connected through the moving contact of a switch 50 to the receiver 55 and transmitter 43. The output of the receiver 55 is applied to the input of a decoder 56. The output of an encoder 44 is coupled to the input of the transmitter 43. The output of a covnerter 57 to which a telephone set 58 is connected is connected to a logic circuit 46. The outputs of the logic circuit 46 and decoder 56 are applied to the converter 57. To the decoder 56 is connected a BS sync detector 53 and a terminating call signal detector 54, the output of the BS sync detector 53 being connected to a timer 52 and to the reset input of a flip-flop 51. The output of timer 52 is connected to the set input of flip-flop 51. The output of flip-flop 51 is connected to one input of an OR gate 49 whose output is connected to the control terminal of a switch 50. the output of terminating call detector 54 is connected to logic circuit 46. To the encoder 44 is connected an originating call signal generator 45, an answer signal generator 47 and a converter 57. A first output from logic circuit 46 is applied to terminating call signal generator 45 and to OR gate 49 and a second output from logic circuit 46 is applied to answer signal generator 47 and OR gate 49. As in repeater stations, transmitter 43 and receiver 55 account for a substantial fraction of the total power consumption of the terminal stations.

The operation of the power saving system will be described briefly with reference to FIGS. 9 to 11.

Repeater stations 2, 3 and terminal stations 4, 61, 62 are initially supplyng power to their transmitters and receivers on a continued basis. The base station transmits BS sync signals in the format of FIG. 5 at regular intervals, the BS sync signal being detected by all the repeater and terminal stations to begin battery saving operation at intervals shown in FIG. 9.

Upon receipt of a BS sync signal, stations 2, 3, 4, 61, 62 cut off their power supplies for an interval $t_1$ and then reactivate their principal units to allow detection of the next BS sync signal and repeat the interrupting operations to save battery power. Assume that when the base station receives a terminating call through the public network which is directed to terminal station 61 for example, it sends out a terminating call signal to that terminal station during the period in which power saving operation is interrupted in the repeater and terminal stations, as shown in FIG. 10. When receiving the terminating call signal, terminal station 61 disables the power saving operation and returns an answer signal to the base station during the time the repeater station 2 is disabling its power saving operation. Upon receipt of the answer signal, the repeater station 2 regenerates it and sends it to the base station 1 and at the same time disables its power saving operation as indicated at A in FIG. 10 which would otherwise be effected in response to a preceding BS sync signal. As a result, a connection is set up between base station 1 and terminal station 61 to allow the call to proceed regardless of the presence of BS sync signals. The same disabling operation occurs in the terminal station 61 as shown at B. While the disabling operation is in progress in the stations noted above, the base station 1 is constantly sending BS sync signals so that the other stations can operate on the power saving mode.

Figure 10:
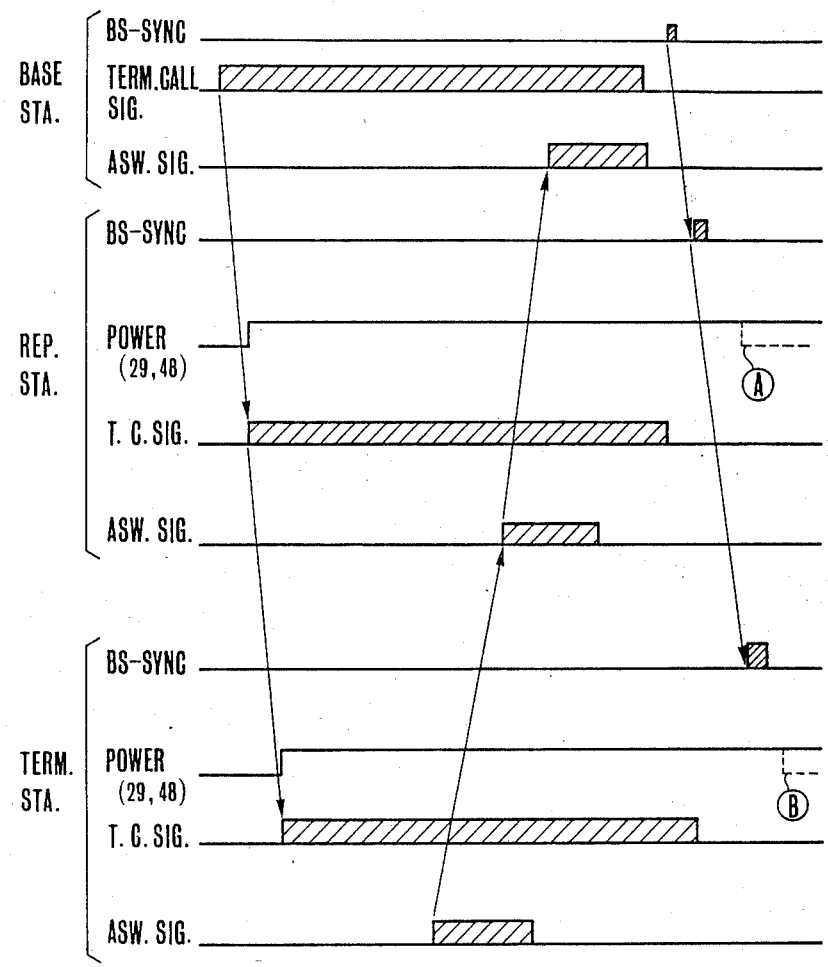
FIG. 10 is a timing diagram of the operation of the base, repeater and terminal stations when handling a terminating call signal.
Figure 11:
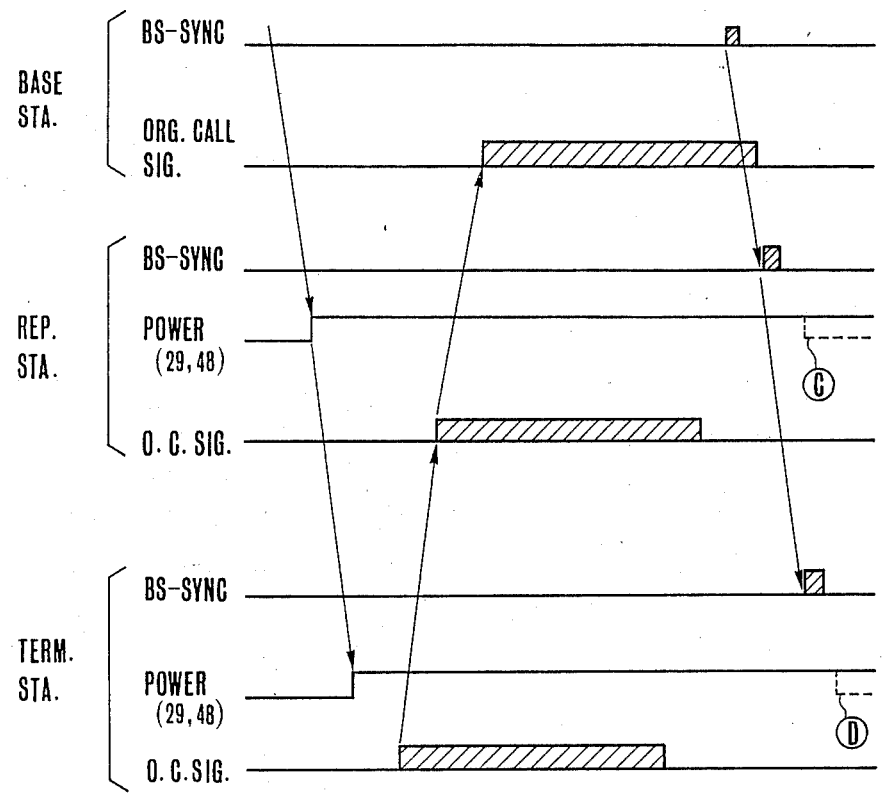
FIG. 11 is a timing diagram of the operation of the base, repeater and terminal stations when handling an originating call signal.

When an originating call is received from a terminal station, operation will proceed as indicated in FIG. 11 in which C and D represent battery saving disablements corresponding respectively to those marked A and B in FIG. 10. During the time power saving operation is being disabled, terminal station 61 transmits an originating call signal to the associated repeater station 2 which regenerates and sends it to the base station 1 while disabling power saving operation. Thereafter, the base station 1 and the terminal station 61 establish a talking connection regardless of the presence of the BS sync signals. During this time other repeater and terminal stations are constantly performing battery saving operations.

A detailed description on the operation of the base station, repeater and terminal stations will further be given with reference to FIGS. 6 to 8.

In FIG. 6, a BS sync signal is generated in the base station 1 by BS sync signal generator 17 in response to the output of the sync pulse generator 16. This BS sync signal is passed through encoder 10, transmitter 11, antenna duplexer 7 to antenna 6 and transmitted to the repeater station 2 and relayed through repeater station 3 to terminal stations. When a call is terminated at the line concentrator 5 through a switched connection established by switching system 12, the time-division multiplexed signal of the call is passed through an idle link of the concentrator to the terminating call signal generator 14. A terminating call signal is generated for each of the successive time slots and transmitted to the repeater station 2 during the interval between successive BS sync signals.

When a call is originated from a terminal station, an originating call signal is transmitted from this terminal station through one or more repeater stations to the base station which receives it through antenna 6, duplexer 7, receriver 8 and decoder 9 at originating call signal detector 13. The line concentrator 5 proceeds to connect the time slot of the originating call to the switching system 12.

In FIG. 7, during idle times each of the repeater stations is constantly receiving BS sync signals transmitted from the base station. The received BS sync signal is conducted through antenna 19, duplexer 21, receiver 23 and regenerator 27 to BS sync detector 36 which delivers an output signal to delay circuit 37 and to timer 35. At the same time, the regenerator 27 regenerates a BS sync signal and transmits it through transmitter 25, duplexer 20 and antenna 18 to repeater and terminal stations. The delay circuit 37 introduces a delay $t_0$ as shown at FIG. 9 to wait for the regenerated BS sync signal to be transmitted. After transmission of the regenerated BS sync signal, the delay circuit 37 resets the flip-flop 34 which in turn provides a turn-off signal through OR gate 33 to the power switch 28, whereby power supply from source 29 to receivers 22, 23 and transmitters 24 and 25 is cut off.

Concurrently, the timer is performing a timing action in response to the output of BS sync detector 36 so that at the end of an interval $t_1$ from the onset of the timing action the flip-flop 34 is triggered into a set condition. When this occurs, a turn-on signal is supplied to the switch 28 to reactivate receivers 22, 23 and transmitters 24, 25. Therefore, a subsequent BS sync signal will be received at time which is delayed by an interval $t_2$ (FIG. 9). As seen in FIG. 10, the BS sync signals are relayed by repeater stations during periods in which power saving is disabled. When the terminating call is detected in the base station, a terminating call signal is transmitted from it and relayed by repeater stations to the destination terminal station which returns an answer signal to the repeater station. This answer signal is intercepted by antenna 18 and applied to receiver 22 and thence to regnerator 26 where the answer signal is regenerated and sent through transmitter 24 from antenna 19 to the base station. The regenerated answer signal is also applied to start pattern detector 30 which identifies it as the onset of a signal that follows and triggers flip-flop 32 into a set condition, causing a turn-on signal to be applied through OR gate 33 to the power switch 28. Timer 31 is also triggered by the output of the start pattern detector 30 to begin a timing action. If the repeater station is receiving speech signals after a connection is established or receiving answer signals in succession from terminal stations during that interval of the timing action, the timer 31 will be retriggered so that flip-flop 32 remains in the set condition. At the end of a call, the timer 31 resets the flip-flop 32 to turn off switch 28 to effect battery saving operation. When an originating call is detected in a terminal station, an orignating call signal is transmitted from it to the repeater station during the interval between successive BS sync signals as shown in FIG. 11. This originating call signal is also intercepted by antenna 18 and detected by the start pattern detector 30 to disable the power saving operation in a manner similar to that effected upon reception of answer signals.

Figure 9:
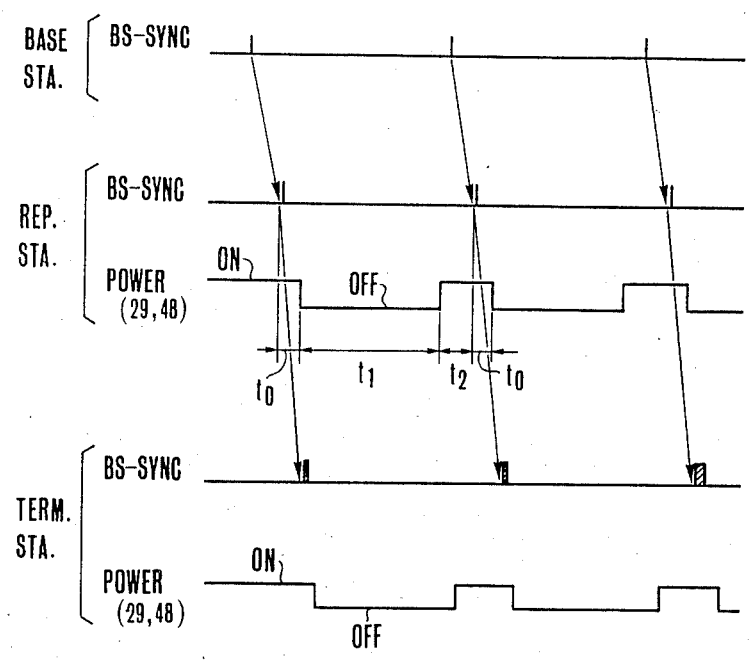
FIG. 9 is a timing diagram of battery saving operations effected in the base station, a repeater station and a terminal station according to the present invention.

In FIG. 9, during idle times BS sync signals relayed from a repeater station are received by terminal stations at antenna 41 and fed through duplexer 42 and receiver 55 to decoder 56 and detected by BS sync detector 53. The output of BS sync detector 53 resets flip-flop 51 to apply a turn-off signal to power switch 50 through OR gate 49, cutting of power supply to transmitter 43 and receiver 55. The output of BS sync detector 53 concurrently activates timer 52 to initiate a timing action. After a predetermined interval, the output of timer 52 triggers the flip-flop 51 to set condition to provide a turn-on signal to switch 50 to reconnect power to receiver 43 and transmitter 55. The terminating call signal relayed from the repeater station is detected by terminating call signal detector 54 whose output is translated by logic circuit 46. Logic circuit 46 applies an output signal to converter 57 which rings the telephone set 58, while at the same time it applies a turn-on signal through OR gate 49 to switch 50 and activates answer signal generator 47. Thus, receiver 55 and transmitter 43 remain activated until the talking connection is disconnected. The output of the answer signal generator 47 is encoded by encoder 44 and fed through transmitter 43 to antenna 41 and transmitted to a repeater station.

A call is originated from any of the terminal stations by hooking off the telephone set 58. The off-hook condition is detected by converter 57 which signals the logic cirucit 46 to activate the originating call signal generator 45 and apply a turn-on signal to switch 50. Transmitter 43 and receiver 55 are activated until the end of the originating call. The originating call signal is supplied through encoder 44 and transmitter 43 to antenna 41 and transmitted to repeater stations.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A power saving system for a time-division multiple access communication network having a first station and a plurality of second stations capable of individually establishing connections with said first station in response to a selection signal and relaying information signals through the established connections, the system comprising:

means for interleaving a power saving control signal at periodic intervals with said selection signal and said information signals and transmitting the interleaved signals from said first station to said second stations;

a plularity of means associated respectively with said second stations for individually cutting off power supplies to said second stations for a predetermined period in response to said control signal; and means for detecting the moment a connection is being established, identifying the second station establishing the connection, and selectively inhibiting one of said power cut-off means associated with the identified second station from responding to said control signal, while allowing the remainder of said power cut-off means to respond to said control signal.

2. A power saving system as claimed in claim 1, further comprising means for interleaving a special code with said interleaved signals in response to the occurrence of said selection signal, and wherein said detecting and identifying means comprises means for detecting said special code and identifying said second station based on the selection signal transmitted with the special code.

3. A power saving system as claimed in claim 1, wherein said detecting and inhibiting means comprises:

code detector means located in each of said second stations for detecting said special code;

delay means connected to said code detector means for introducing a delay time in response to the detection of said special code; and bistable means responsive to an output signal from said code detector means for generating a power-saving disabling signal and responsive to an output signal from said delay means for generating a power-saving enabling signal, the power cut-off means associated with each of said second stations being responsive to said power-saving disabling and enabling signals to effect power supply disablement and enablement, respectively.

4. A power saving system for a time-division multiple access communication system having a base station, a plularity of terminal stations capable of establishing connections with said base station in response to a selection signal and one or more repeater stations for relaying information signals through said connections, comprising:

means for interleaving a power saving control signal at periodic intervals with said information signals and transmitting the interleaved signals from said base station to said terminal stations through one or more of said repeater stations;

a plularity of means associated respectively with said repeater and terminal stations for individually cutting off their power supplies for a predetermined period in response to said control signal; and means for detecting the moment a connection is being established, identifying the repeater station and terminal station between which said connection is being established and selectively inhibiting one of said power cut-off means associated with the identified repeater station and terminal station from responding to said control signal, while allowing the remainder of said power cut-off means to respond to said control signal.

5. A power saving system as claimed in claim 4, further comprising means for interleaving a special code with said interleaved signals in response to the occurrence of said selection signal, and wherein said detecting and identifying means comprises means for detecting said special code and identifying said second station based on the selection signal transmitted with the special code.

6. A power saving system as claimed in claim 3, further comprising means for interleaving a special code with said interleaved signals in response to the occurrence of a request for establishing a connection, and wherein said detecting and inhibiting means comprises:

code detector means located in each of said repeater stations for detecting said special code;

delay means connected to said code detector means for introducing a delay time in response to the detection of said special code; and bistable means responsive to an output signal from said code detector means for generating a power-saving disabling signal and responsive to an output signal from said delay means for generating a power-saving enabling signal, the power cut-off means associated with each of said repeater stations being responsive to said power-saving disabling and enabling signals to effect power supply disablement and enablement, respectively.

7. A power saving system as claimed in claim 5, wherein said interleaved special code is transmitted from each of said terminal station to said repeater stations.

8. A method for saving power in a time-division multiple access communication system, the system comprising a first station and a plurality of second stations capable of individually establishing connections with said first station in response to a selection signal and relaying information signals through the established connections, the method comprising:

(a) interleaving a power saving control signal at periodic intervals with said information signals;

(b) transmitting the interleaved signals from said first station to said second stations;

(c) detecting the moment a connection is being established and identifying the second station establishing said connection;

(d) inhibiting the second station to which said connection is being established from responding to said control signal; and (e) individually cutting off power supplies to the second stations other than the last-mentioned second station for a predetermined period in response to said control signal.

9. A method as claimed in claim 7, further comprising interleaving a special code and said selection signal with said interleaved signals, and wherein the step (d) comprises detecting said special code and identifying said second station based on the selection signal interleaved with the special code.

10. A time-division multiple access communication network having a first station and a plurality of second stations capable of individually establishing connections with said first station in response to a selection signal and relaying information signals through the established connections, the network comprising:
- means for interleaving a power saving control signal at periodic intervals with said selection signal and said information signals and transmitting the interleaved signals from said first station to said second stations;
- a plularity of means associated respectively with said second stations for individually cutting off power supplies to said second stations for a predetermined period in response to said control signal; and
- means for detecting the moment a connection is being established, identifying the second station establishing the connection, and selectively inhibiting one of said power cut-off means associated with the identified second station from responding to said control signal, while allowing the remainder of said power cut-off means to respond to said control signal.

11. A time-division multiple access communication network as claimed in claim 10, further comprising means for interleaving a special code with said interleaved signals in response to the occurrence of said selection signal, and wherein said detecting and identifying means comprises means for detecting said special code and identifying said second station based on the selection signal transmitted with the special code.

12. A time-division multiple access communication network as claimed in claim 10, wherein said detecting and inhibiting means comprises:
- code detector means located in each of said second stations for detecting said special code;
- delay means connected to said code detector means for introducing a delay time in response to the detection of said special code; and
- bistable means responsive to an output signal from said code detector means for generating a power-saving disabling signal and responsive to an output signal from said delay means for generating a power-saving enabling signal, the power cut-off means associated with each of said second stations being responsive to said power-saving disabling and enabling signals to effect power supply disablement and enablement, respectively.

* * * * *